United States Patent [19]

Barski

[11] Patent Number: 4,636,891
[45] Date of Patent: Jan. 13, 1987

[54] MAGNETIC DISC CARTRIDGE WITH VENTILATING STRUCTURE

[75] Inventor: Guy Barski, Paris, France
[73] Assignee: CII Honeywell Bull, France
[21] Appl. No.: 462,910
[22] Filed: Feb. 1, 1983

[30] Foreign Application Priority Data

Feb. 11, 1982 [FR] France .............................. 82 02207

[51] Int. Cl.[4] ........................ G11B 25/04; G11B 23/02
[52] U.S. Cl. .......................................... 360/97; 360/99
[58] Field of Search ...................... 360/97–99, 360/133, 135, 86; 346/137; 206/444

[56] References Cited

U.S. PATENT DOCUMENTS

| | | | |
|---|---|---|---|
| 3,740,735 | 6/1973 | Gabor | 360/97 |
| 3,812,534 | 5/1974 | Rousseau et al. | 360/133 |
| 3,846,835 | 11/1974 | Horovitz et al. | 360/98 |
| 4,078,246 | 3/1978 | Berthoux et al. | 360/133 |
| 4,194,225 | 3/1980 | Hasler | 360/98 |
| 4,285,018 | 8/1981 | Mulvany et al. | 360/98 |
| 4,377,830 | 3/1983 | Patel | 360/98 |

FOREIGN PATENT DOCUMENTS

| | | | |
|---|---|---|---|
| 0113177 | 9/1980 | Japan | 360/97 |
| 2024495 | 1/1980 | United Kingdom | 360/97 |
| 2040538A | 8/1980 | United Kingdom | |

OTHER PUBLICATIONS

Bosier, M. H., "Contamination Control System for a Disk Cartridge", Jun. 1979, vol. 22, No. 1, pp. 360–361.

Primary Examiner—John H. Wolff
Assistant Examiner—David J. Severin
Attorney, Agent, or Firm—Lowe, Price, LeBlanc, Becker & Shur

[57] ABSTRACT

A magnetic disc in a cartridge is ventilated to keep a data containing surface portion thereof substantially free of particulate materials. A recirculating gas path includes apertured conduits for supplying gas jets completely across the portion as the disc is rotating in an enclosure. An orifice removes gas from the enclosure. A fan circulates the gas removed from the enclosure through the orifice and supplies the circulated gas back to the apertured conduits. Magnetic heads are positioned relative to the orifice and an inlet for the gas jets such that the gas has laminar flow as the gas passes the magnetic heads so the gas flow does not affect the position of the heads relative to the disc portion. The recirculating path includes filters for removing particulate materials from the recirculating gas.

12 Claims, 14 Drawing Figures

MAGNETIC DISC CARTRIDGE WITH VENTILATING STRUCTURE

TECHNICAL FIELD

The present invention relates generally to magnetic disc memories and more particularly to a magnetic disc memory method and apparatus wherein gas is circulated across the disc to keep a disc face free of particulate material and to a cartridge particularly adapted to be used with such a memory.

BACKGROUND ART

Magnetic disc memory units are widely used in data processing systems because such units have high storage capacity and require relatively short time for read/write heads of a disc memory to access data stored at a given point on the disc in response to a disc memory address supplied to the memory unit. Magnetic discs employed in disc memory units carry data on circular concentric tracks, typically positioned on both sides of the disc. The tracks generally have a width of no more than a few dozen microns. To transduce, i.e., read and write, data on the disc, magnetic heads of the memory units are positioned adjacent opposite faces of the disc, at a distance of a few tenths of a micron.

The magnetic discs are rotatably driven by an electric motor of the disc memory unit at a constant rotational speed. Current memory units frequently include a limited number of discs, i.e., one or two discs, and have a relatively limited storage capacity, on the order of ten to several tens of millions of bytes. Each byte typically includes eight bits, i.e., a binary digit data unit having a value equal to one or zero, as indicated by a magnetic flux transition on a track of the disc. Typically, at least one disc is enclosed in a cartridge that is selectively inserted into and removed from a receptacle of the magnetic disc memory unit. A disc memory unit receptacle normally contains only a single removable cartridge. When a cartridge is immediately inserted into the receptacle as soon as read and/or write operations have been completed on the disc in the initially inserted cartridge. Thus, plural removable cartridges, each containing at least one magnetic disc, are used with a single disc memory unit.

Certain disc memory units contain two magnetic discs, one of which remains permanently inside the disc memory unit; the other disc is contained in a cartridge that is selectively inserted and removed from the disc memory unit receptacle.

Cartridges containing removable magnetic discs have standarized shapes and dimensions, enabling them to be used interchangeably with magnetic disc units of different manufacturers. Thereby, the standarized cartridges are easily inserted into and removed from the receptacles of many different magnetic disc memory units. The cartridges are constructed to protect discs located therein from contamination by dust and other particulate matter during periods while the cartridges are not in use, i.e., while a particular cartridge is not in a magnetic disc memory unit receptacle. The prior art cartridges typically include structure for ventilating the disc while the cartridge is in the disc memory unit receptacle, thereby to insure that the disc remains extremely clean, to increase reliability of data read from the disc. Exemplary of such a cartridge which is selectively inserted into and removed from a receptacle of a magnetic disc memory unit is disclosed in U.S. Pat. No. 4,078,246, commonly owned with the present invention, and entitled "Container For A Magnetic Disc".

The cartridge disclosed in the U.S. Pat. No. 4,078,246 contains a rigid disc having a relatively small diameter. The cartridge is relatively flat, having a height less than one tenth the length or width thereof. The cartridge is inserted into a suitable disc memory unit receptacle. The cartridge includes a side wall having an opening which is normally closed while the cartridge is not in use, i.e., when the cartridge is not in the disc memory unit receptacle. When the cartridge is in the disc memory unit receptacle, magnetic read/write heads of the unit extend through the opening and are moveable relative to recording tracks on the disc. The cartridge includes a mechanism for coupling a hub carrying the disc to a rotary drive mechanism, usually an electric motor, of the disc memory unit.

The cartridge includes rigid, elastically deformable, opposed, generally parallel walls having a tendency to be outwardly convex in a free state. At the center of one of the parallel walls is an internal projection, forming an annular bearing surface facing an inside face of the one wall. The other wall includes an opening coaxial with the center of the one wall. The opening in the other wall is surrounded by an annular bearing surface on the outside face of the other wall. The disc is carried by an annular hub having internal and external flanges positioned to engage the bearing surfaces of the other wall. The axial spacing between the flanges is less than the spacing between the bearing surfaces of the other wall while the other wall is in the free state, whereby when the disc is in an idle state and the parallel walls are flattened an elastic restoring force mechanically holds the disc in proper position. When the cartridge is in the receptacle of the magnetic disc memory and the disc is being driven, the disc is able to turn because the walls are urged toward each other, with a concave configuration. The bearing surfaces and flanges are constructed so that the cartridge is sealed when not in use, thereby protecting the hub carrying the disc and the disc from dust particles. By selecting suitable relative positions and diameters for the flanges, the disc is automatically ventilated during operation in response to a centrifugal effect of air on opposite faces of the disc, to provide cleaning of dust and other particular matter from the disc surface, as well as cooling.

Other removable magnetic disc cartridges having different ventilating systems are known. Such a cartridge is disclosed, for example, in U.S. Pat. No. 3,812,534, entitled "Ventilation Device For Magnetic Disc Unit", and commonly owned with the present application.

A magnetic disc memory unit includes a receptacle for receiving the cartridge. The cartridge disclosed in U.S. Pat. No. 3,812,534 contains at least one magnetic disc and includes first and second lateral openings through which brushes and read/write heads are respectively introduced through walls of the receptacle.

The cartridge of U.S. Pat. No. 3,812,534 includes a conduit for receiving filtered air supplied to the receptacle through an opening in the cartridge. The air supplied to the cartridge leaves the cartridge through the opening in the cartridge through which the heads extend. The filtered air introduced into the cartridge is circulated with the turning disc in response to a centrifugal force produced by the disc rotation. The filtered air has a tendency to escape to the periphery of the disc in response to the centrifugal force. A regulator positioned in a filtered conduit for supplying air to the cartridge provides a constant air flow to the cartridge, which flow is relatively independent of pressure applied to a ventilation conduit intake, to prevent overly rapid clogging of the filter. Thereby, the life of the filter is prolonged, an advantageous feature because disc memories must normally be provided with very high capacity, relatively expensive air filters.

As disclosed, for example, in commonly owned U.S. Pat. No. 4,298,898 data written onto discs enclosed in removable cartridges are separated into adjacent, circular, equal sized segments, with each side or face of the disc being normally divided into several dozen segments. Each segment is divided into two portions of different sizes, such that the larger portion contains data processed or to be processed by a data processing system including the disc memory unit containing the cartridge. The smaller portion contains track identification data used by the data processing system for positioning the read/write magnetic heads of the memory unit relative to the disc tracks. Within each segment, the smaller portion is separated into a number of reference areas. The number of reference areas is equal to the number of tracks, such that each track is associated with a single, separate area. The number of data bits per unit length along the circumference of a disc track is referred to as "longitudinal data density", while "radial density" indicates the number of tracks per unit length measured along the disc diameter.

The current trend in developing magnetic discs is focused particularly on obtaining substantial increases in radial and longitudinal densities. Typically, radial densities are on the order of 350 to 400 tracks per centimeter, i.e., 850 to 1,000 tracks per inch (TPI), while the longitudinal densities are on the order of 2,000 bits per centimeter, i.e., 5,000 bits per inch (bpi).

It is difficult to obtain the same longitudinal and radial densities on removable magnetic discs enclosed in cartridges as on a disc which remains fixed permanently inside a disc memory unit. The removable feature of such cartridge enclosed magnetic discs is a limiting factor on the longitudinal and radial densities thereof because it is very difficult to obtain an adequately clean environment inside of the cartridge. Any cartridge that can not be air tight to the same degree as a disc which remains fixed permanently inside a disc memory unit may, due to variations in prevailing climatic conditions, absorb dust or other foreign particulate materials in varying quantities. Because the cartridge enclosure is separate from the enclosure in which magnetic read/write heads are situated when the cartridge is not inserted in a receptacle of the magnetic disc unit, there is a high probability that a certain amount of contaminated air enters the cartridge when the cartridge is inserted into the receptacle. In other words, air containing foreign particles originating from the disc memory unit enclosure containing the magnetic read/write heads has a tendency to enter the cartridge. Because foreign particulate materials, such as dust, may be as large or larger than the distance separating the magnetic heads and the magnetic coating on the disc, there is a high probability of errors occurring in reading or writing data.

Thereby, to obtain signals having the same spatial resolution as the resolution of magnetic variations on the disc it is necessary to minimize dust and other foreign particulate materials within the cartridge. In addition, it is necessary to eliminate residual dust which may remain in the cartridge after it has been inserted into the disc memory unit receptacle. Reducing contamination from dust and other foreign paticulate materials in the cartridge is difficult to achieve to an adequate degree in self ventilated cartridges, such as described in U.S. Pat. No. 4,078,246 because there frequently remains very minute particles on the disc surface, which particles have dimensions on the order of the space occupied by data bit on the disc.

It has also been found that a ventilation system such as described in U.S. Pat. No. 3,812,534 does not provide an adequate degree of cleanliness inside of the cartridge. In addition, the system disclosed in U.S. Pat. No. 3,812,534 exhausts air through the same opening as through which read/write heads are introduced; the air introduced through the same opening as the opening through which the read/write heads are introduced may disturb the position of the heads relative to the magnetic disc.

It is, accordingly, an object of the present invention to provide a new and improved ventilation system and method for a cartridge containing a removable magnetic disc, wherein contamination by dust or other foreign particles is considerably reduced.

Another object is to provide a new and improved magnetic disc cartridge having provisions for circulating gas against surfaces of the disc to dislodge particulate materials that adhere to the disc while in storage and prevent accumulation of such materials on the disc while in use.

DISCLOSURE OF INVENTION

In accordance with one aspect of the invention, an apparatus for ventilating a magnetic disc, to keep a surface portion of the disc containing data substantially free of particulate materials, includes means for recirculating gas over the disc, mounted in an enclosure for rotation about an axis. A recirculating gas path includes aperture means for supplying gas jets completely across the disc data containing portion as the disc is rotating. The gas jets remove particles that tend to adhere to the disc during storage and prevent particulate material from adhering to the disc portion while a cartridge containing the disc is in a receptacle of the memory unit. The path also includes an orifice for removing gas from the enclosure and fan means for circulating the gas removed from the enclosure by the orifice. The fan means circulates the gas about the axis as the disc is rotating and supplies the circulated gas back to the aperture means. The fan means accelerates air withdrawn from the enclosure through the orifice so that the gas has sufficient velocity to lift dust particles from the disc and prevent further dust particles from adhering to the disc while it is in the receptacle.

The recirculating path includes filter means for removing particulate materials from the gas circulating in the recirculating path between the orifice and the aperture means. The filter means includes separate first and second filters in an inlet and an outlet of the fan means. Preferably, the fan means is mounted coaxially with the disc in a chamber removed from the enclosure, so that the disc and fan means are in separate planes. The chamber containing the fan means is connected in fluid flow relationship with the enclosure only by the aperture means and the orifice.

To prevent particulate material contamination of the interior of the enclosure while the cartridge is not in place in the receptacle, a first gate means is positioned between an outlet of the fan means and the aperture means, while a second gate means is positioned between an inlet of the fan means and the orifice. In addition, an aperture in the enclosure through which read/write heads of the memory unit extend is closed simultaneously with closure of the first and second gate means while the cartridge is not in place in the receptacle.

To prevent movement of the head means by the gas which prevents particles from adhering to the disc, the aperture means and orifice are positioned so there is laminar flow across the head. In particular, the aperture means is disposed at different radii across the disc data containing portion while the orifice is positioned farther from the axis than any part of the aperture means. The aperture means and orifice are positioned so that the gas flows between them in an outwardly directed spiral through at least one complete revolution. Laminar flow past the head occurs because the head is more than a half revolution from the aperture means and orifice, as well as because side walls of the enclosure are smooth. Turbulence in the gas flow is minimized because the flow of gas in the spiral is in the same direction as the direction that the disc turns.

In accordance with another aspect, the invention is directed to a magnetic disc cartridge including first conduit means for supplying gas to the disc containing data portion to remove particulate material from the portion and prevent particulate material from adhering to the disc as the disc rotates about the axis. Second conduit means withdraws the gas supplied to the enclosure by the supply from the enclosure. The gas supply means and gas withdrawing means are part of a recirculating path for the gas. One of the conduit means includes a filter for removing particulate material from the gas. The enclosure includes an opening through which extend magnetic transducing head means of a disc memory unit when the cartridge is in place in a receptacle of the unit. Gate means close both the conduit means and the opening when the cartridge is in place in the receptacle.

It is, accordingly, still another object of the invention to provide a new and improved method of and apparatus for circulating gas in a magnetic disc enclosure, wherein the gas is circulated in such a manner as to prevent movement of magnetic head means of a memory unit with which the disc in the enclosure functions.

The above and still further objects, features and advantages of the present invention will become apparent upon consideration of the following detailed description of several specific embodiments thereof, especially when taken in conjunction with the accompanying drawings.

Figure 1:
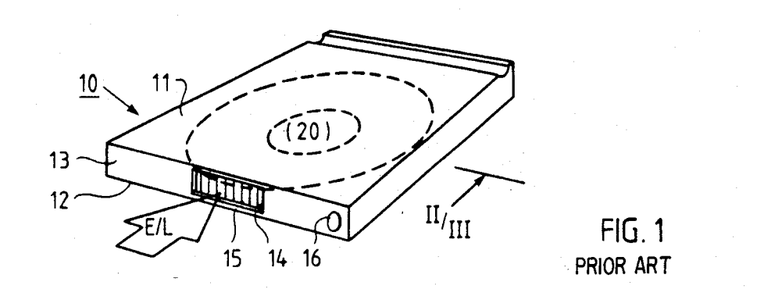
FIGS. 1, 2 and 3 are illustrations of an embodiment of a conventional, prior art cartridge containing at least one removable magnetic disc.
Figure 2:
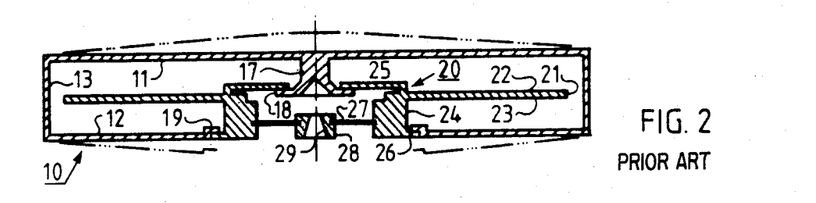
Figure 3:
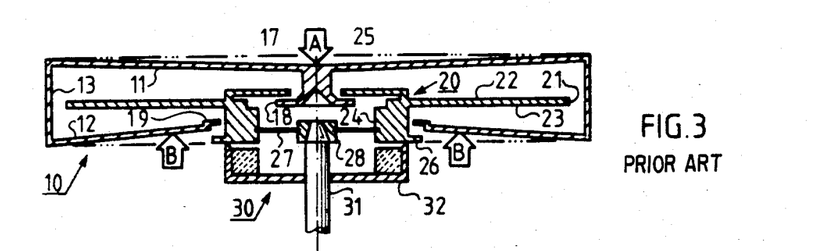

DETAILED DESCRIPTION OF FIGS. 1-3

To provide a better understanding of the principles of assembly and operation of the cartridge carrying removable magnetic disc according to the present invention, the prior art configuration illustrated in FIGS. 1-3 is considered. The cartridge illustrated in FIGS. 1-3 is of the type disclosed and illustrated in U.S. Pat. No. 4,078,246.

As illustrated in FIG. 1, magnetic disc 20 is enclosed in cartridge 10, configured as a relatively flat box having square top and bottom walls 11 and 12. One side wall 13 of cartridge 10 includes aperture 14, normally closed by shutter 15 when the cartridge is not being used, i.e., when the cartridge is not in a disc memory unit receptacle. Shutter 15 is operated by a known tamper proof internal mechanism, to insure that the aperture is not obstructed while the cartridge is in the magnetic disc memory unit receptacle. Immediately after shutter 15 is opened, magnetic read/write heads E/L, represented by an arrow in FIG. 1, are introduced into cartridge 10 to read data stored on both sides of magnetic disc 20. Cartridge 10 is formed by an assembly of parts made of a rigid, but elastically deformable material.

In FIG. 2, cartridge 10 is illustrated as being in an idle or rest state, outside of a magnetic disc memory unit, between successive operating periods. In FIG. 2, upper wall 11 is illustrated as including a center, internal projection 17, terminating with an external extractor ring flange 18, forming an annular bearing surface generally parallel to walls 11 and 12 within cartridge 10. Wall 12 includes an opening coaxial with projection 17. The edge of the opening in wall 12 is defined by annular bearing surface 19.

Disc 20 is a flat annular body 21 having flat parallel faces 22 and 23, both covered with a magnetic recording coating. Disc 20 includes annular hub 24 having axially spaced and opposed extremities in the interior and exterior of the volume between walls 11-13. The extremity of hub 24 within walls 11-13 carries an inwardly extending flange 25 that engages the top face of flange 18. The external extremity of hub 24 includes outwardly extending flange 26, having a top surface which engages the bottom face of flange 19 surrounding the opening in wall 12. Hub 24 includes an internal axial passage fitted with diaphragm, 27, which is either star shaped or perforated to enable gas to pass through it. Diaphragm 27 carries centering ring 28 having a frusto-conical socket or tapered hole 29.

Opposing end walls 11 and 12 of cartridge 10 are maintained substantially planar and parallel to each other, as shown by the solid lines in FIG. 2 while the cartridge is at rest, i.e., not in use. The elastic nature of walls 11 and 12, however, tends to cause the walls to be flexed outwardly, to assume a convex shape, as shown by the dotted lines in FIG. 2. There is therefore an elastic restoring force exerted on walls 11 and 12 to maintain disc 20 in place while the cartridge is in an idle or storage period. Thereby, an air tight seal is provided where flanges 25 and 26 meet bearing surfaces 18 and 19.

In FIG. 3 the position of disc 20 inside of cartridge 10 is illustrated, assuming that the cartridge is in situ within a receptacle of a magnetic disc memory unit. In response to cartridge 10 being loaded into the receptacle, walls 11 and 12 are deflected into a concave condition so that the walls move closer to each other, as indicated by the solid line positions of walls 11 and 12. The relative movement of walls 11 and 12 between the rest and service conditions is indicated in FIG. 3 by comparing the dotted line positions of the walls, as subsists when the cartridge is not in use, and the solid line positions. Because walls 11 and 12 are deflected inwardly when cartridge 10 is in the receptacle, flanges 25 and 26 of hub 20 are disengaged from bearing surfaces 18 and 19 of cartridge 10 to enable the disc to be rotated, cleaned and ventilated while it is driven by motor assembly 20 of the disc memory unit. Disc 20 and hub 24 which carries it are driven by a motor, preferably an electric motor, of the disc memory unit. The motor is coupled to spindle 31 having a tapered head which fits into tapered hole 29 of centering ring 28. Fixedly mounted on spindle 31 is platter 32, having a longitudinally extending flange with an edge for engaging the bottom face of flange 26 of hub 24. Platter 32 is perforated and magnetically coupled between hub 24 and spindle 31.

In this conventional, prior art cartridge, dust and foreign particles are removed by a self ventilation process that occurs within the disc. In particular, natural ventilation is obtained by a centrifugal effect of air being rotated in response to the disc rotating. It can be shown that when very high radial and longitudinal densities are desired, the natural ventilation is inadequate to achieve complete decontamination of the disc, as well as the cartridge interior. It has been found that particulate materials, such as dust and other foreign particles, remain in the cartridge and on the disc. The dimensions of the particulate material are on the same order of magnitude as the spacing between the magnetic read/write heads and the disc surface, as well as on the same order of magnitude as the dimensions of the magnetic data variations recorded on the disc. Such foreign particles are therefore detrimental to the reliability of data read from the disc and can cause errors in reading track address in signals from the disc. Errors in reading track address signals result in positioning errors of the magnetic heads over the disc tracks. It has been found that the resulting magnetic head positioning errors can not be fully corrected by devices for controlling the position of the read/write heads over the disc tracks. It has also been found that a ventilation system, such as disclosed and claimed in U.S. Pat. No. 3,812,534 does not eliminate dust and other foreign particles sufficiently.

DETAILED DESCRIPTION OF PREFERRED EMBODIMENT

The cartridge of the present invention obviates the foregoing disadvantages in the prior art cartridges.

Figure 4:
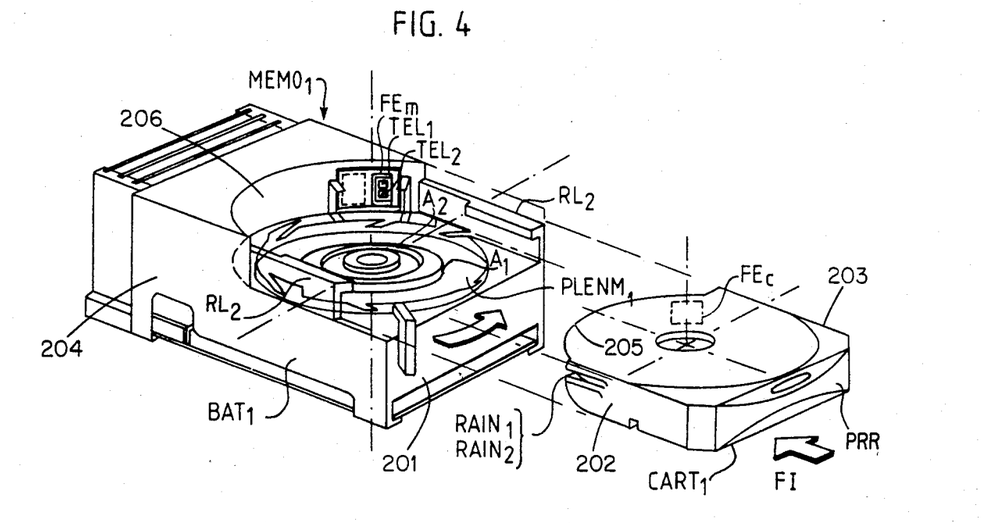
FIG. 4 is a three-quarters perspective view of the overall exterior outline of a cartridge ventilated according to the present invention, in combination with a disc memory unit frame and receptacle into which the cartridge is inserted.

As illustrated in FIG. 4, cartridge $CART_1$, containing a single removable disc $DISC_1$, is designed to be inserted into receptacle 201 of frame $BAT_1$, a part of magnetic disc memory unit MEMO. Cartridge $CART_1$ includes grip PPR to facilitate handling by an operator who inserts the cartridge into receptacle 201. Cartridge $CART_1$ includes parallel, opposite side walls 202 and 203 in which are formed grooves $RAIN_1$ and $RAIN_2$. Grooves $RAIN_1$ and $RAIN_2$ are received in tracks $RL_1$ and $RL_2$ on opposite interior side walls of frame $BAT_1$ within receptable 201. Longitudinal tracks $RL_1$ and $RL_2$ enable cartridge $CART_1$ to be slid into receptacle 201 in the direction indicated by arrow FI.

Cartridge $CART_1$ includes an arcuate side wall 205 which generally extends between side walls 202 and 203. Side wall 205 includes aperture $FE_c$, normally covered when cartridge $CART_1$ is out of receptacle 201, by a suitable shutter. In response to cartridge $CART_1$ being inserted into receptacle 201, the shutter covering aperture $FE_c$ is opened to enable read/write heads $TEL_1$ and $TEL_2$ of memory MEMO to be inserted adjacent opposite faces of disc $DISC_1$. When cartridge $CART_1$ is not in receptacle 201, heads $TEL_1$ and $TEL_2$ are positioned behind a door normally closing aperture $FE_m$ in side wall 206 in the receptacle, which side wall corresponds with side wall 205 of the cartridge.

As illustrated in FIG. 4, for example, a rotary drive mechanism for disc $DISC_1$ in cartridge $CART_1$ includes drive platter $PLENM_1$, an integral part of a spindle of an electric motor (not shown) of memory unit MEMO. Drive platter $PLENM_1$ includes a horizontal reference plane $\pi$ (FIG. 7) for receiving hub $MOY_1$ (FIG. 5) of cartridge $CART_1$ when the cartridge is inserted in receptacle 201. Extending at right angles to plane $\pi$ is the axis of rotation $Ax_r$ of drive platter $PLENM_1$. Concentric with axis $Ax_r$ and extending from plane $\pi$ are circular flanges $A_1$ and $A_2$, having interior walls extending in a direction parallel to axis $Ax_r$. Flange $A_1$ is at the outer periphery of platter $PLENM_1$, while flange $A_2$ is at an intermediate position between axis $Ax_r$ and flange $A_1$.

Figure 7:
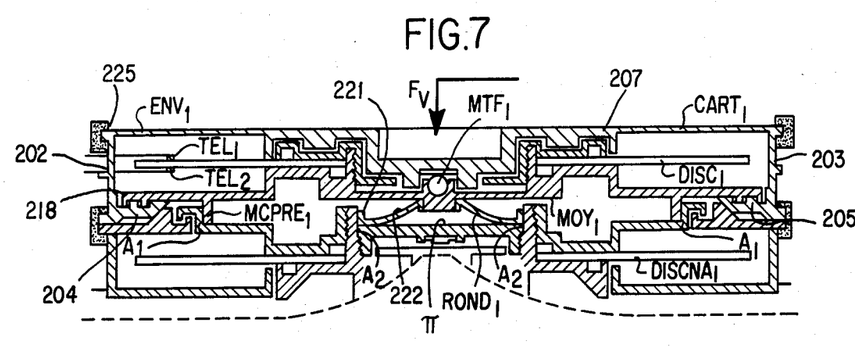
FIG. 7 is a cross-sectional view of the cartridge illustrated in FIG. 5, in the memory unit receptacle.
Figure 12:
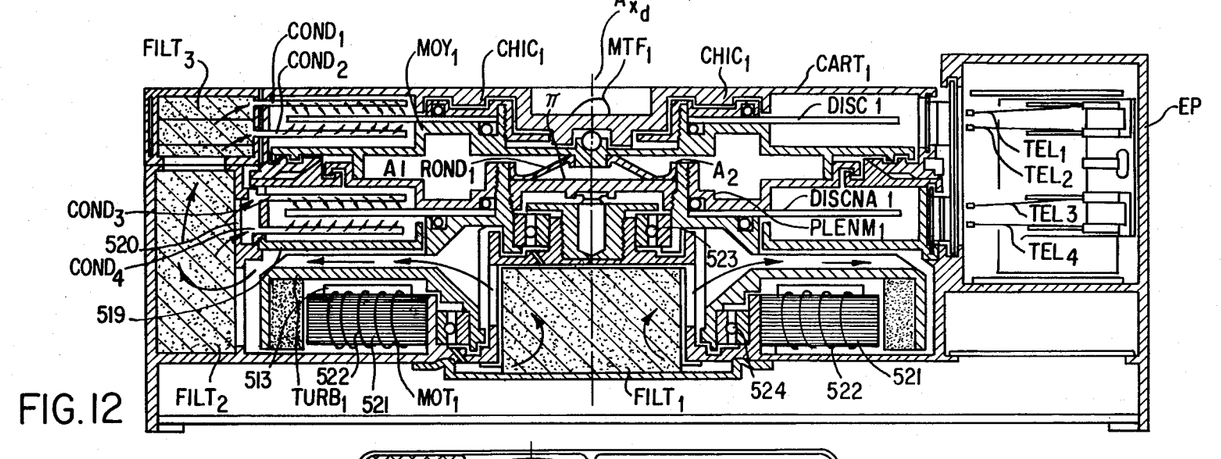
FIG. 12 is a side sectional view of one embodiment of a ventilation system in accordance with the invention, in combination with a single disc cartridge in accordance with the invention.

As described infra in connection with FIGS. 7 and 12, memory unit MEMO includes a magnetic disc which remains permanently in frame $BAT_1$; to simplify FIG. 4, the magnetic disc located permanently inside of frame $BAT_1$ is not shown. Disc $DISC_1$ and the disc permanently located in frame $BAT_1$ are driven by the same electric motor of memory MEMO.

Figure 5:
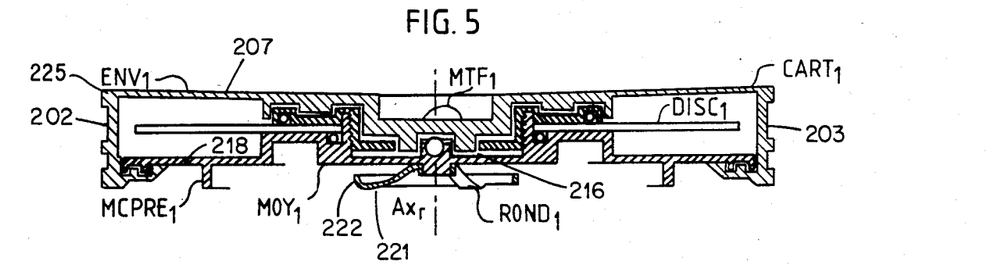
FIGS. 5 and 6 are cross-sectional views of cartridges respectively containing one and four discs, which cartridges are assumed to be in an idle state, outside of the memory unit receptacle.

Reference is now made more particularly to FIGS. 5 and 7, detailed side views of a single disc cartridge of the present invention when located outside of receptacle 201 and in place in the receptacle, respectively. Cartridge $CART_1$ includes elastically deformable plastic exterior shell $ENV_1$. Shell $ENV_1$ includes top wall 207 that extends between side walls 202 and 203. When cartridge $CART_1$ is outside receptacle 201 top wall 207 has a concave configuration, with a nadir approximately on axis $Ax_r$. When cartridge $CART_1$ is in receptacle 201, the outer edges of top face 207 are deflected downwardly so that the top face is substantially planar, as illustrated in FIG. 7. Extending inwardly from side walls 202 and 203 are flanges 204 and 205, having upper faces abutting against a lower face of hub $MOY_1$ when cartridge $CART_1$ is outside of receptacle 201. When cartridge $CART_1$ is in place in receptacle 201, side walls 202 and 203 are deflected downwardly so that the upper faces of flanges 204 and 205 are spaced from the lower face of hub $MOY_1$. When cartridge $CART_1$ is outside of receptacle 201 the spring force of top face 207 against hub $MOY_1$ provides a relatively secure static friction fit between flanges 214 and 215 and the bottom face of hub $MOY_1$ to seal the interior of shell $ENV_1$ from the outside environment. Downward deflection of side walls 202 and 203 when cartridge $CART_1$ is in receptacle 201 removes this sealing relationship and enables hub $MOY_1$ to turn freely in response to rotation of drive platter $PLENM_1$ about axis $Ax_r$.

Downwardly depending from the bottom face of hub $MOY_1$ is circular flange $MCPRE_1$, concentric with hub axis $Ax_d$. The outer face of flange $MCPRE_1$ is removed from $Ax_d$ by a distance slightly less than the distance separating the inner wall of flange $A_1$ from axis $Ax_r$. The outer wall of flange $MCPRE_1$ and the inner wall of lip $A_1$ are thus positioned with respect to each other so that in response to substantial misalignment between axis $Ax_r$ of platter $PLENM_1$ and axis $Ax_d$ of hub $MOY_1$ when cartridge $CART_1$ is in receptacle 201 a portion of the walls of the lip and flange engage each other. When cartridge $CART_1$ is approximately correctly positioned in receptacle 201 so that there is substantial alignment between axes $Ax_r$ and $Ax_d$, there is no contact between the adjacent walls of lip $A_1$ and flange $MCPRE_1$ and a bottom edge of the flange engages reference plane $\pi$ of platter $PLENM_1$. Thereby, flange $MCPRE_1$ and wall $A_1$ can be considered as a "precentering means or mechanism" for cartridge $CART_1$.

Fixedly secured to hub $MOY_1$ is elastically deformable ring $ROND_1$, forming an elastically deformable mechanism for precisely centering hub $MOY_1$ relative to rotation axis $Ax_r$ of platter $PLENM_1$. Ring $ROND_1$ includes a first surface 221 generally at right angles to the hub axis of rotation $Ax_d$ and a second surface 222 extending generally coaxially with the hub axis of rotation. When cartridge $CART_1$ is inserted into receptacle 201, the elastic structure of ring $ROND_1$ is deformed so that surfaces 221 and 222 respectively bear against reference plane $\pi$ and an interior wall of circular flange $A_2$, extending at right angles from reference plane $\pi$. The contact between surface 221 and plane $\pi$ and surface 222 and the interior wall of flange $A_2$ frictionally holds ring $ROND_1$ in place against plane $\pi$ and flange $A_2$ to repeatedly position hub axis $Ax_d$ at the same location relative to rotation axis $Ax_r$.

Shell $ENV_1$ and hub $MOY_1$ include a mechanism $MTF_1$ to transmit a compressive force $F_v$ along hub axis $Ax_d$, at right angles to the plane of disc $DISC_1$, to hub $MOY_1$ and ring $ROND_1$ when cartridge $CART_1$ is in receptacle 201. Mechanism $MTF_1$ includes a pad secured to top wall 207 and a ball captured against the pad. When cartridge $CART_1$ is outside of receptacle 201, as illustrated in FIG. 5, mechanism $MTF_1$ exerts virtually no force against hub $MOY_1$ whereby ring $ROND_1$ remains in a relatively relaxed, undeformed state because of the undeformed, concave state of top wall 207 and the positioning of side walls 202 and 203 which causes the top face of flanges 214 and 215 to engage the bottom face of disc 18. When cartridge $CART_1$ is in receptacle 201, top wall 207 is deflected downwardly whereby mechanism $MTF_1$ exerts a compressive force on hub $MOY_1$ along the hub axis $Ax_d$. The compressional force along hub axis $Ax_d$ causes ring $ROND_1$ to be deformed so that surfaces 221 and 222 thereof respectively engage plane $\pi$ and the interior wall of flange $A_2$.

When cartridge $CART_1$ is inserted into receptacle 201, grooves $RAIN_1$ and $RAIN_2$ of the cartridge slide along and are guided on longitudinal tracks $RL_1$ and $RL_2$. Cartridge $CART_1$ is locked in receptacle 201 in response to a conventional lever (not shown) which is a part of memory MEMO and therefore external to the cartridge. The lever is an integral part of a threaded sleeve, a part of frame $BAT_1$ of memory MEMO. In response to the lever locking cartridge $CART_1$ in receptacle 201, top wall 207 is deflected from the concave position illustrated in FIG. 5 to the relatively flat position illustrated in FIG. 7. Simultaneously, side walls 202 and 203 descend vertically from the position illustrated in FIG. 5 to the position illustrated in FIG. 7; a typical downward movement of walls 202 and 203 is on the order of four millimeters. Hub $MOY_1$ is precentered inside of lip $A_1$. Precentering hub $MOY_1$ enables cartridge $CART_1$ to attain a proper position with relative ease when the cartridge is positioned in receptacle 201. As described supra, flange $MCPRE_1$ is positioned inside of lip $A_1$, with the bottom edge of the flange engaging reference plane $\pi$.

Hub $MOY_1$ is then precisely centered using ring $ROND_1$. The precise centering occurs in response to a sleeve (not shown) inside of frame $BAT_1$ causing a uniform pressure $P_v$ to be exerted downwardly against ear 225 which extends outwardly from side walls 202 and 203 about the periphery of shell $ENV_1$. The uniform pressure $P_v$ causes deformation of elastic shell $ENV_1$ from the position illustrated in FIG. 5 to the position illustrated in FIG. 7. By deforming shell $ENV_1$ to the position illustrated in FIG. 7, pressure $P_v$ transmits a compressive stress to ring $ROND_1$ via mechanism $MTF_1$ and hub $MOY_1$. In response to the compressive stress applied to ring $ROND_1$, the ring is deformed. Prior to deformation, while force $Fv$ is not applied, the diameter of ring $ROND_1$ is such that there is play of about 20 to 25 microns between surface 222 of the ring and the interior wall of flange $A_2$. In response to compressive force $F_v$, the diameter of ring $ROND_1$ expands slightly so that the periphery of the ring, i.e., surface 222, contacts the inside walls of flange $A_2$ and exerts a lateral pressure $P_1$ perpendicular to the interior wall of flange $A_2$. In addition, the compressive force $F_v$ on ring $ROND_1$ flattens the ring so that surface 221 of the ring contacts reference plane $\pi$, to exert a pressure $P_N$ normal to the reference plane. Simultaneously with surface 221 of ring $ROND_1$ exerting a force against reference plane $\pi$, the bottom edge of flange $MCPRE_1$ exerts an additional normal pressure on reference plane $\pi$. Thus, the effect of compressive force $F_v$ is to insure consistent centering of axis $Ax_d$ of hub $MOY_1$, and therefore of the center of disc $DISC_1$, relative to axis $Ax_r$. In addition, compressive force $F_v$ provides an effective coupling between hub $MOY_1$ and platter $PLENM_1$. The coupling is provided by the static frictional force which effectively adheres flange $A_1$ to reference plane $\pi$ and which effectively adheres surface 222 of ring $ROND_1$ to the wall of flange $A_2$.

Simultaneously with deformation of ring $ROND_1$, flange 215 disengages from disc 218, as described supra. At this time, aperture $FE_c$ opens to allow heads $TEL_1$ and $TEL_2$ to extend through wall 206 into shell $CART_1$ in proximity to opposite faces of disc $DISC_1$. With heads $TEL_1$ and $TEL_2$ in place, disc $DISC_1$ is rotatably driven by the connection between platter $PLENM_1$ and hub $MOY_1$, on which disc $DISC_1$ is fixedly mounted.

Additional details of the precentering and centering mechanism and the operation thereof are provided in copending, commonly assigned, simultaneously filed application entitled "Magnetic Disc Cartridge With Centering Structure", U.S. Ser. No. 462,911, filed Feb. 1, 1983.

Figure 6:
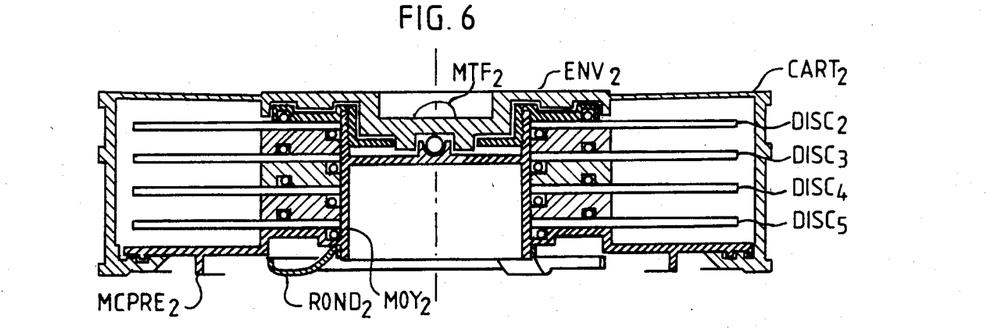

The ventilation system according to the present invention is applicable to a cartridge containing plural removable magnetic discs, as illustrated in connection with cartridge $CART_2$, FIG. 6, containing discs $DISC_2$–$DISC_5$. The principles of assembly and operation of cartridge $CART_2$ are identical to those of cartridge $CART_1$. Cartridge $CART_2$ includes hub $MOY_2$ on which are mounted discs $DISC_2$–$DISC_5$. Hub $MOY_2$ carries elastically deformable, precision centering disc $ROND_2$, responsive to forces exerted through mechanism $MTF_2$, including a pad and ball. Hub $MOY_2$ is roughly centered by a precentering mechanism similar to that described in connection with FIGS. 5 and 7; in particular, hub $MOY_2$ includes circular flange $MCPRE_2$, similar to flange $MCPRE_1$.

Figure 8:
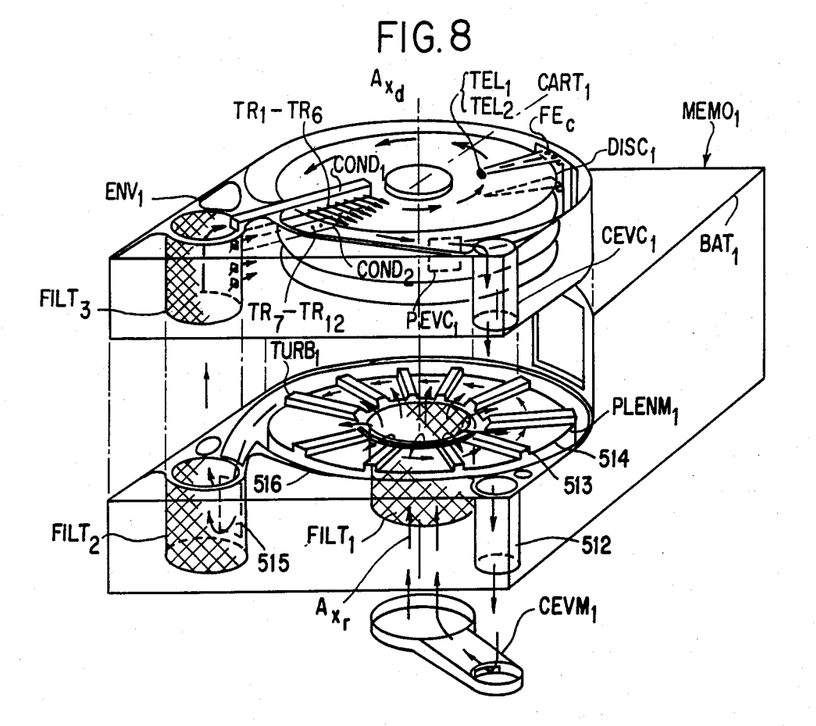
FIG. 8 is a three-quarters perspective view, in schematic form, of a ventilation system for the cartridge illustrated in FIGS. 5 and 7.

Consideration is now given to the ventilation system adapted to be used in connection with the single disc cartridge $CART_1$ of FIGS. 5 and 7, by referring to FIG. 8. The ventilation system supplies gas, preferably air, to opposite faces of disc $DISC_1$, to lift off particulate materials having a tendency to become attached to the disc data containing portion while the disc is not in use and to supply a flow of gas over the disc data containing portion while the disc is rotating about axis $Ax_d$ in receptacle 201, to substantially prevent particulate material from adhering to the portion while the disc is rotating. To these ends, cartridge $CART_1$ includes conduits $COND_1$ and $COND_2$ which extend generally radially of disc $DISC_1$. Air is pumped to ends of conduits $COND_1$ and $COND_2$ beyond the periphery of disc $CART_1$ by way of filter $FILT_3$, contained in cartridge $CART_1$. Air supplied to conduits $COND_1$ and $COND_2$ is directed against opposite faces of disc $DISC_1$ by orifices $TR_1$–$TR_6$ and $TR_7$–$TR_{12}$ on conduits $COND_1$ and $COND_2$, respectively.

Orifices $TR_1$–$TR_6$ and $TR_7$ and $TR_{12}$ are positioned on a side wall of conduits $COND_1$ and $COND_2$ so that air jets flowing through the apertures flow in the same direction as the rotation direction of disc $DISC_1$. The air flowing through the orifices of conduits $COND_1$ and $COND_2$ flows outwardly away from axis $Ax_d$ with a spiral motion past heads $TEL_1$ and $TEL_2$ through orifice $PAST_1$ on smooth substantially circular interior wall 525 of cartridge $CART_1$, which interior wall surrounds and is closely spaced from disc $DISC_1$. Aperture $PEVC_1$ is positioned between conduits $COND_1$ and $COND_2$ and heads $TEL_1$ and $TEL_2$ when cartridge $CART_1$ is in receptacle 201. Conduits $COND_1$ and $COND_2$ and aperture $PEVC_1$ are positioned such that the vast majority of the air flowing between them makes at least one spiral turn. Heads $TEL_1$ and $TEL_2$ are positioned relative to the orifices in conduits $COND_1$ and $COND_2$ and orifice $PEVC_1$ such that there is laminar air flow past the heads, whereby the air flow does not affect the position of the heads relative to disc $DISC_1$. In particular, the laminar air flow does not cause the spacing between heads $TEL_1$ and $TEL_2$ relative to disc $DISC_1$ to change so that signals derived from data tracks on disc $DISC_1$ are not affected by the air flowing between conduits $COND_1$ and $COND_2$ and orifice $PEVC_1$. To these ends, there is more than a 180° separation between heads $TEL_1$ and $TEL_2$ and conduits $COND_1$ and $COND_2$, as well as orifice $PEVC_1$. The smoothness of wall 525 also contributes to the laminar flow past heads $TEL_1$ and $TEL_2$, as does introducing air through the orifices of conduits $COND_1$ and $COND_2$ in the same direction as the rotation of disc $DISC_1$.

Air flowing through orifice $PEVC_1$ flows into conduit $CEVC_1$. Conduit $CEVC_1$ is an integral part of cartridge $CART_1$, being located behind interior wall 525 of the cartridge in which orifice $PEVC_1$ is located. Conduit $CEVC_1$ has a longitudinal axis generally parallel to the axis of rotation $Ax_d$ of disc $DISC_1$. Air flowing through conduit $CEVC_1$ flows into conduit 512, thence through conduit $CEVM_1$ into filter $FILT_1$. Conduits 512, $CEVM_1$ and filter $FILT_1$ are located in frame $BAT_1$ of disc memory unit MEMO. Conduit 512 is aligned with conduit $CEVC_1$ when cartridge $CART_1$ is inserted in receptacle $TR_1$. Conduit $CEVM_1$ includes an opening responsive to air flowing through conduit 512, whereby conduit $CEVM_1$ directs air radially of axis $Ax_d$ of disc $DISC_1$. Filter $FILT_1$ has a cylindrical configuration, with an axis coincident with axis $Ax_r$ of rotary platter $PLENM_1$.

Figure 9:
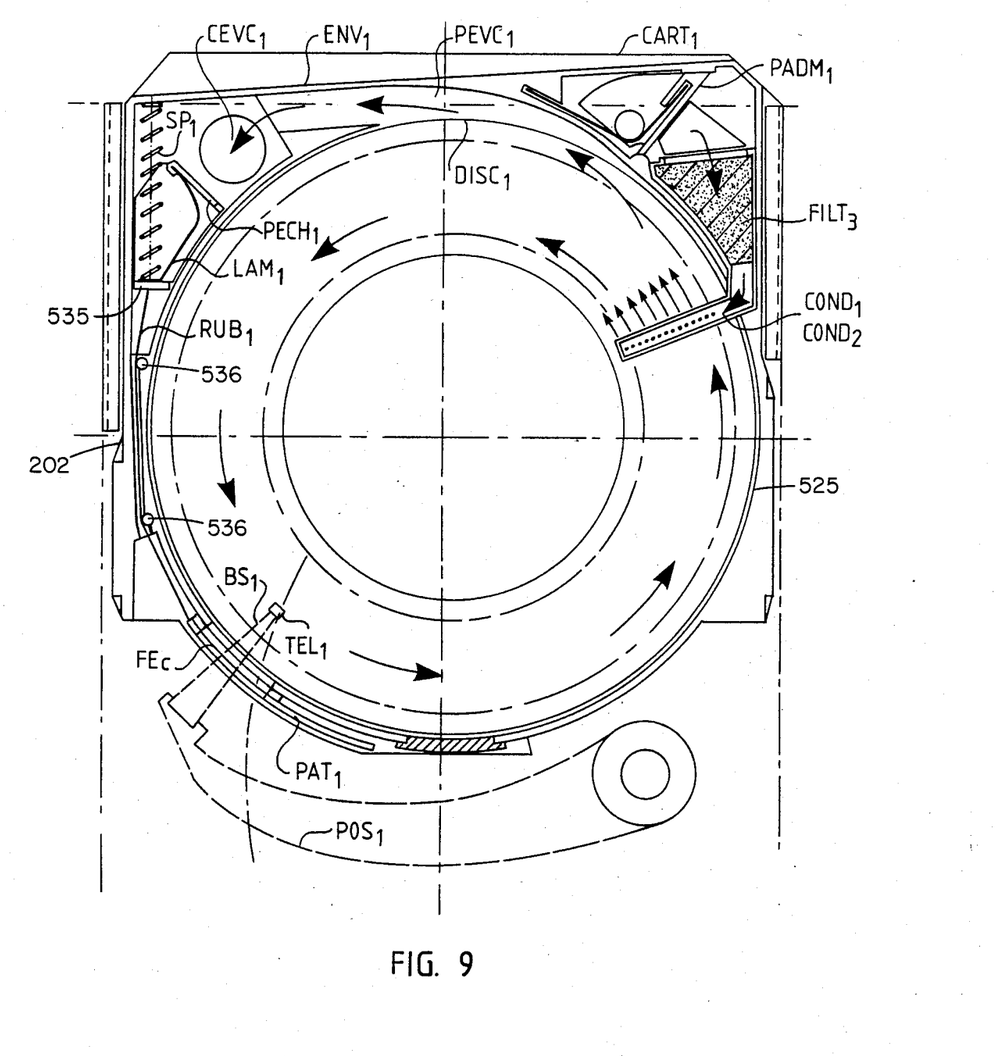
FIG. 9 is a top sectional view of a cartridge in accordance with the invention, in combination with a ventilation system in accordance with the invention, wherein the cartridge is illustrated as being positioned inside of a disc memory unit receptacle.
Figure 11:
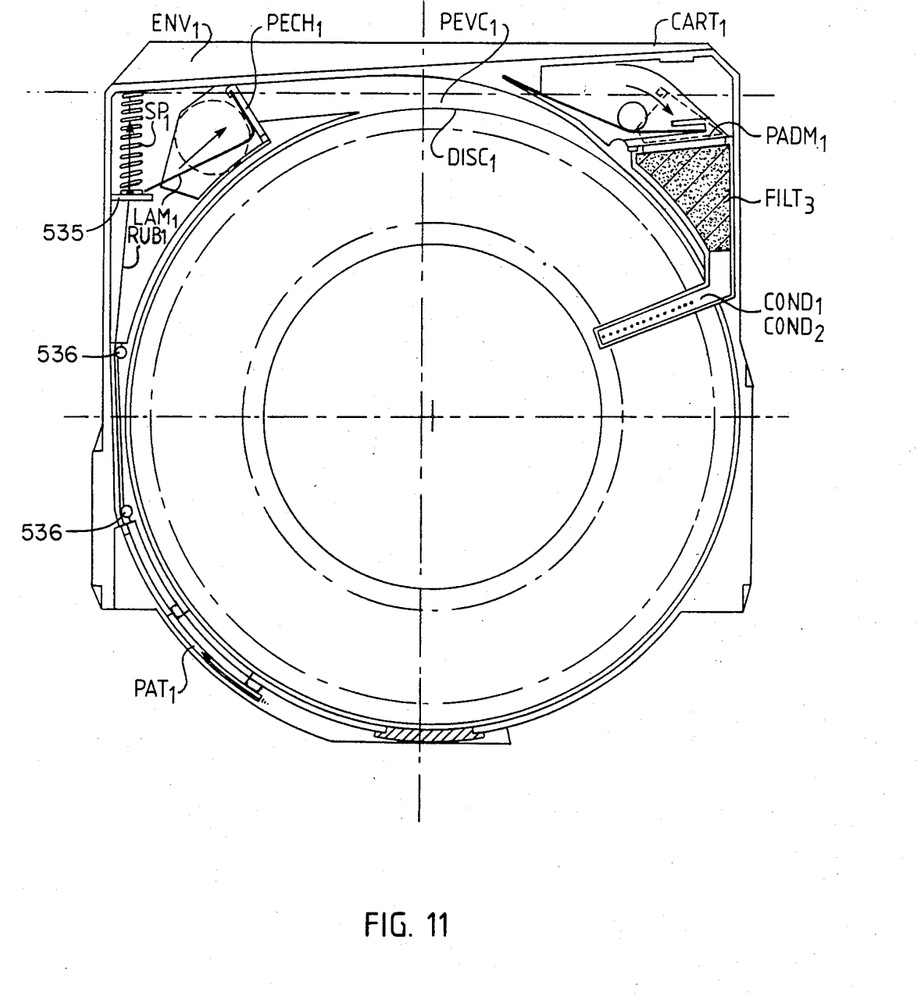
FIG. 11 is a top sectional view of a cartridge in accordance with the invention when the cartridge is not inserted into the memory disc unit receptacle.
Figure 13:
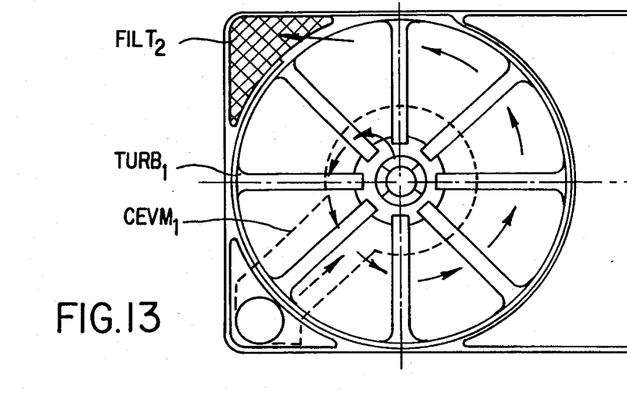
FIG. 13 is a top cross-sectional view of rotary fan mechanism that is part of the ventilation system in accordance with the invention.

Air is pumped longitudinally through filter $FILT_1$ by fan $TURB_1$, having radially directed blades 513. Fan $TURB_1$ and disc platter $PLENM_1$ are driven by the same motor at the same speed. Air pumped by fan $TURB_1$ is confined to a relatively narrow region between blades 513, by virtue of close spacing between pie shaped troughs 514 between the blades and a roof immediately above the blades. Thereby, as illustrated in FIG. 13, air from filter $FILT_1$ flows radially between blades 513 and is carried between the blades to orifice 515, positioned in circular wall 1516 slightly beyond the periphery of fan $TURB_1$. The air flowing through orifice 515 flows longitudinally through cylindrical filter $FILT_2$, thence to cylindrical filter $FILT_3$. Filters $FILT_3$ and $FILT_2$ have aligned longitudinal axes when cartridge $CART_1$ is in receptacle 201. While filters $FILT_2$ and $FILT_3$ are schematically shown in FIG. 8 as cylinders, they preferably have a generally triangular cross-section, as illustrated in FIGS. 9 and 11.

The air filtered by filter $FILT_3$ is introduced through the apertures in conduits $COND_1$ and $COND_2$ at sufficient pressure to form decontaminating air jets that lift dust particles that become attached to the surface of disc $DISC_1$ during periods while cartridge $CART_1$ is not in use. The air jets are supplied against the opposite faces of disc $DISC_1$, around the center of the disc. The air jets are driven by centrifugal force produced in response to rotation of the disc, toward the periphery of the disc, where they flow through exhaust orifice $PEVC_1$. The speed of the air flowing over the faces of disc $DISC_1$ is augmented by the partial vacuum created in the center of drive platter $PLENM_1$ by fan $TURB_1$. Thus, air is circulated through the ventilation system in response to rotation of disc $DISC_1$ which causes the air to circulate tangentially on the surfaces of each side of the disc at a speed equal to the disc rotation speed, and by fan $TURB_1$ which aspirates air which passes through orifice $PEVC_1$ and conduits $CEVC_1$, 512, $CEVM_1$, as well as filters $FILT_1$, $FILT_2$ and $FILT_3$. Pump $TURB_1$ also draws fresh air through filter $FILT_1$.

To minimize the amount of contaminated air introduced into cartridge $CART_1$ while it is in receptacle 201 and to enhance the efficiency of the ventilating system, heads $TEL_1$ and $TEL_2$ are located in hermetically sealed enclosure EP, FIG. 12, of disc memory unit MEMO. Thereby, when a gate for opening $FE_c$ is opened when cartridge $CART_1$ is inserted in receptacle $A_2$, no contaminated air is introduced through the opening as heads $TEL_1$ and $TEL_2$ are urged in proximity with disc $DISC_1$.

Filter $FILT_2$ removes substantially all contaminates produced by bearings of drive platter $PLENM_1$ and an electric motor that drives the drive platter. Filter $FILT_1$ is the main filter for eliminating dust particles that have been lifted off of disc $DISC_1$ by air introduced through conduits $COND_1$ and $COND_2$, as well as contaminates removed from the walls of conduits $CEVC_1$, 512 and $CEVM_1$ by the air flowing against these walls. Filter $FILT_3$ substantially eliminates particulate materials produced at the interface between cartridge $CART_1$ and the wall of receptacle 201 of disc memory unit MEMO.

Figure 10:
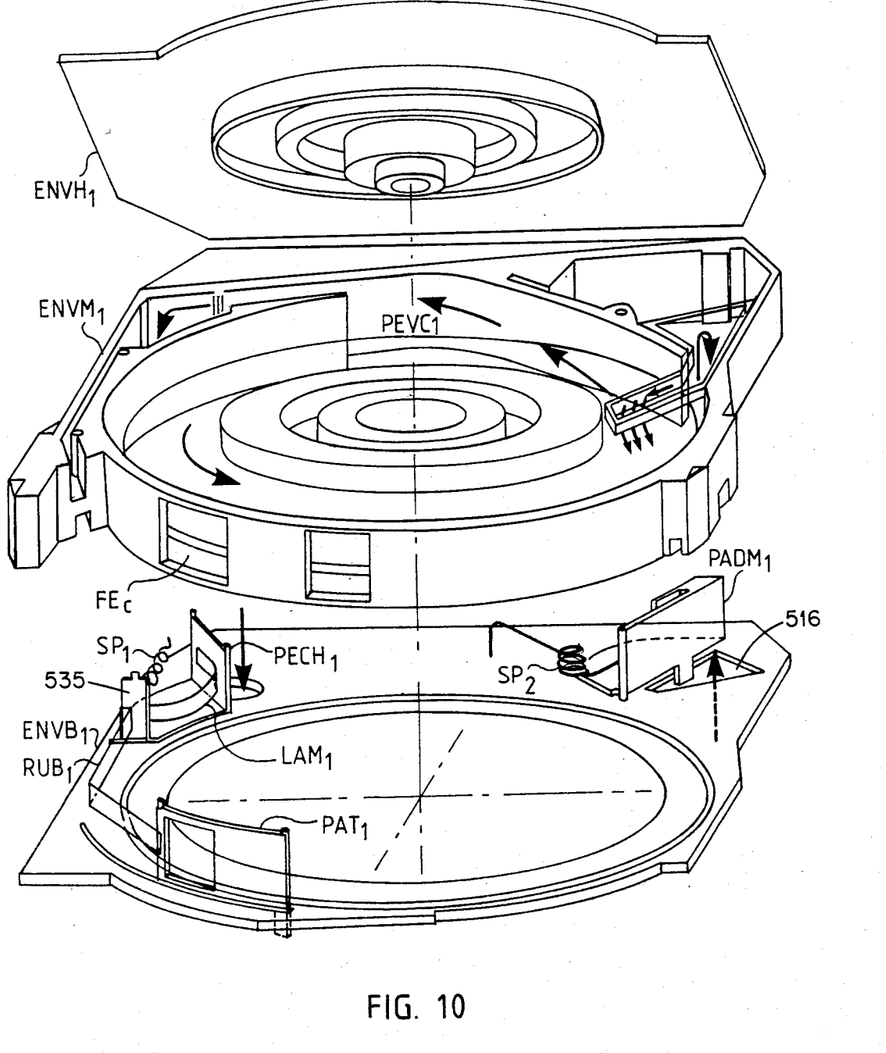
FIG. 10 is a three-quarters perspective view of a shell of a cartridge ventilated by a system according to the invention, wherein it is indicated how filtered air circulates inside of the cartridge.

Reference is now made to FIGS. 9-11, detailed drawings of the portion of the ventilation system located inside of cartridge $CART_1$ Shell $ENV_1$ of cartridge $CART_1$ is formed of an upper part $ENVH_1$, intermediate part $ENVM_1$ and lower part $ENVB_1$. Orifice $PEVC_1$, included in intermediate part $ENVM_1$, is selectively closed by air exhaust gate $PECH_1$. Gate $PECH_1$ is mechanically connected to head access gate $PAT_1$ which selectively closes opening $FE_c$ when cartridge $CART_1$ is not in place in receptacle 201. Gate $PECH_1$ closes conduit $CEVC_1$ when cartridge $CART_1$ is not in receptacle 201. Similarly, gate $ENVM_1$ closes conduits $COND_1$ and $COND_2$ when cartridge $CART_1$ is not in receptacle 201.

As illustrated in FIG. 10, gates $PECH_1$, $PAT_1$ and $PADM_1$ extend upwardly from lower cartridge segment $ENVB_1$ into cartridge segment $ENVM_1$. The height of gates $PECH_1$, $PAT_1$ and $PADM_1$ is such that the upper edges of the gates abut against the bottom face of upper cartridge segment $ENVH_1$ to provide the desired sealing or closing effect when cartridge $CART_1$ is not in receptacle 201. Gates $PECH_1$ and $ENVM_1$ slide on rubberized joints on cartridge segment $ENVB_1$ between the open and closed positions thereof by a motion that is generally radial with respect to the axis of disc $DISC_1$, while gate $PAT_1$ slides peripherally relative to the disc on another rubberized joint. To provide simultaneous opening and closing of gates $PECH_1$ and $PST_1$, actuating mechanisms for the gates are connected together by metallic band $RUB_1$, having one end connected to an edge of gate $PAT_1$, and a second edge connected to one face of plate 515. Band $RUB_1$ is held in position about the periphery of disc $DISC_1$, between gate $PAT_1$ and plate 535 by posts 536. The face of plate 535 opposite from the face connected to band $RUB_1$ is connected to one end of compression spring $SP_1$, and to one end of metal band $LAM_1$. The other ends of spring $SP_1$ and band $LAM_1$ are respectively connected to an interior wall of cartridge $CART_1$ and to a face of gate $PECH_1$. With gates $PECH_1$ and $PAT_1$ in the closed position, as illustrated in FIG. 11, spring $SP_1$ is compressed, to draw plate 515 toward the wall of cartridge $CART_1$ on which spring $SP_1$ is mounted. Thereby, gate $PECH_1$ is urged in position, to block a passageway in intermediate section $ENVM_1$ between conduit $CEVC_1$ and orifice $PEVC_1$. Simultaneously, plate 515 tensions band $RUB_1$, to pull gate $PAT_1$ over aperture or opening $FE_c$.

When cartridge $CART_1$ is inserted in place in receptacle 201, a sleeve (not shown) which is an integral part of frame $BAT_1$ causes gate $PAT_1$ to move peripherally from the position shown in FIG. 11 to the position shown in FIG. 9. The action of the sleeve on gate $PAT_1$ causes the gate to tension band $RUB_1$, to drive plate 535 from the position illustrated in FIG. 11 to the position illustrated in FIG. 9, whereby spring $SP_1$ expands. The movement of plate 535 from the position illustrated in FIG. 11 to the position illustrated in FIG. 9, causes band $LAM_1$ to translate gate $PECH_1$ from the position illustrated in FIG. 11 to the position illustrated in FIG. 9. Thereby, orifice $PEVC_1$ is open, to enable air circulating inside of cartridge $CART_1$ to flow into conduit $CEVC_1$.

Simultaneously with opening of gates $PECH_1$, gate $PADM_1$ is open. To this end, one face of gate $PADM_1$ is connected to one end of torsion spring $SP_2$, having a second end fixedly connected to lower cartridge segment $ENVB_1$. Gate $PADM_1$ includes a downwardly depending tab that engages opposed walls in aperture 516 in lower segment $ENVB_1$ when the gate is opened and closed. Aperture 516 leads to a conduit in frame $BAT_1$, which conduit is filled by filter $FILT_2$.

As illustrated in FIG. 11, when cartridge $CART_1$ is not in receptacle 201, aperture 516 is not in fluid flow relationship with filter $FILT_3$ by virtue of gate $PADM_1$ being closed. To open gate $PADM_1$, the sleeve which acts on gate $PAT_1$ acts on gate $PADM_1$ to overcome the bias of torsion spring $SP_2$, and urge gate $PADM_1$ against the back edge of aperture 516. Thereby, air flows through aperture 516 and filter $FILT_3$ into conduits $COND_1$ and $COND_2$, thence through the orifices of the conduits against opposite faces of disc $DISC_1$. As illustrated in FIG. 9, the air flowing through the orifices of conduits $COND_1$ and $COND_2$ flows in an outwardly directed spiral at least once around disc $DISC_1$, thence through orifice $PEVC_1$ into conduit $CEVC_1$.

Immediately after gate $PAT_1$ opens aperture $FE_c$, heads $TEL_1$ and $TEL_2$ move through the aperture to a designated track in the data portion of disc $DISC_1$, as illustrated in FIG. 9 for head $TEL_1$. To these ends, head $TEL_1$ is mounted at the end of support arm $BS_1$, having another end fixedly mounted on one end of leg $POS_1$, another end of which is fixedly connected to shaft 517. Shaft 517 is rotatably driven by a motor (not shown) to drive head $TEL_1$ from a position outside of cartridge $CART_1$ to a position over an addressed track on disc $DISC_1$.

Shaft 517, leg $POS_1$, arm $BS_1$ and head $TEL_1$ are located in hermetically sealed enclosure EP, FIG. 12. Enclosure EP is progressively pressurized in response to rotation of disc $DISC_1$ being initiated. Thereby, there is a minimum amount of turbulence in the air exchanged between enclosure EP and the interior of cartridge $CART_1$ to maintain the position of heads $TEL_1$ and $TEL_2$ constant relative to disc $DISC_1$. The introduction of turbulent air in the vicinity of heads $TEL_1$ and $TEL_2$ by virtue of a sudden pressure change across opening $FE_c$ could possibly damage the heads, by causing them to deflect downwardly into contact with disc $DISC_1$.

Reference is now made to FIG. 12 of the drawing, a cross-sectional view of the ventilation system in memory unit MEMO with cartridge $CART_1$ being located inside of receptacle 201. The memory unit of FIG. 12 includes disc $DISCNA_1$, permanently mounted in the memory unit coaxially with disc $DISC_1$ so that both discs are driven by rotary platter $PLENM_1$ when cartridge $CART_1$ is in receptacle 201. While disc $DISC_1$ and $DISCNA_1$ are being driven, data are written onto and read from them by heads $TEL_1$–$TEL_4$, which are located in sealed enclosure EP when the discs are not being driven. Heads $TEL_3$ and $TEL_4$ are driven from enclosure EP into proximity with discs $DISC_1$ and $DISCNA_1$ in the same manner and by a similar mechanism to that described supra to drive heads $TEL_1$ and $TEL_2$ into proximity with disc $DISC_1$ of cartridge $CART_1$.

With cartridge $CART_1$ in place in receptacle 201, axis $Ax_d$ of disc $DISC_1$ is precentered by flanges $A_1$ and $MCPRE_1$, respectively carried by rotary platter $PLENM_1$ of disc memory unit MEMO and hub $MOY_1$ of cartridge $CART_1$. After the axis of disc $DISC_1$ has been precentered, the disc axis is precisely centered by ring $ROND_1$ engaging reference plane $\pi$ and flange $A_2$ in response to a compressive force being exerted on compressive stress transmission mechanism $MTF_1$.

On FIG. 12, the flow path through filter $FILT_1$ to troughs 514 between vanes 513 of fan $TURB_1$, mounted coaxially with axis $Ax_r$, is clearly indicated. Blades or vanes 513 have a height relative to trough 514 and wall 519 to cause the air flowing from filter $FILT_1$ to be captured between adjacent ones of the vanes so that the air flows in a generally spiral path, as indicated in FIG. 13, to filter $FILT_2$. From filter $FILT_2$ the air flows into filter $FILT_3$ to conduits $COND_1$ and $COND_2$. In addition, air flows from filter $FILT_2$ through orifice 520 into conduits $COND_3$ and $COND_4$. Conduits $COND_3$ and $COND_4$ contain orifices similar to the orifices in conduits $COND_1$ and $COND_2$ to supply high pressure air against opposite faces of disc $DISCNA_1$. The air directed against the opposite faces of disc $DISCNA_1$ circulates in an outwardly directed spiral to an orifice positioned similarly to orifice $PEVC_1$. The air circulated in the chamber including disc $DISCNA_1$ flows into conduit 512, thence conduit $CEVM_1$ and back to filter $FILT_1$.

Rotary drive platter $PLENM_1$ for discs $DISC_1$ and $DISCNA_1$ and fan $TURB_1$ is driven about axis $Ax_r$ by motor $MOT_1$. Motor $MOT_1$ includes a stator containing laminated cores 521 which extend radially from axis $Ax_r$. Coils 522 are wound on cores 521 and are excited in a conventional manner to drive platter $PLENM_1$. Fan $TURB_1$ is mounted on platter $PLENM_1$ coaxially with axis $Ax_r$ so that the fan is turned at the same speed as discs $DISC_1$ and $DISCNA_1$. Cores 521 are fixedly positioned in frame $BAT_1$ immediately below fan $TURB_1$.

Drive platter $PLENM_1$ includes ball bearings 523 for supporting flange $A_2$, and therefore the drive mechanism in cartridge $CART_1$ for disc $DISC_1$. In addition, ball bearings 524 are provided between motor $MOT_1$ and fan $TURB_1$ and therefore the drives for disc $DISC_1$ and $DISCNA_1$. Ball bearings 523 and 524 have a tendency to emit oil and other contaminating particulate materials. To prevent the particualte materials from ball bearings 523 and 524 from contaminating the space in cartridge $CART_1$ where disc $DISC_1$ is located, a tortuous path including baffles $CHIC_1$ is provided along the top wall of shell $ENV_1$ between the center portion of the cartridge, inside of the inner diameter of disc $DISC_1$, into the region where the data containing portion of the disc is located. Baffles $CHIC_1$ may be replaced with ferrofluidic joints, such as those manufactured by Ferrofluidics Incorporated.

Figure 14:
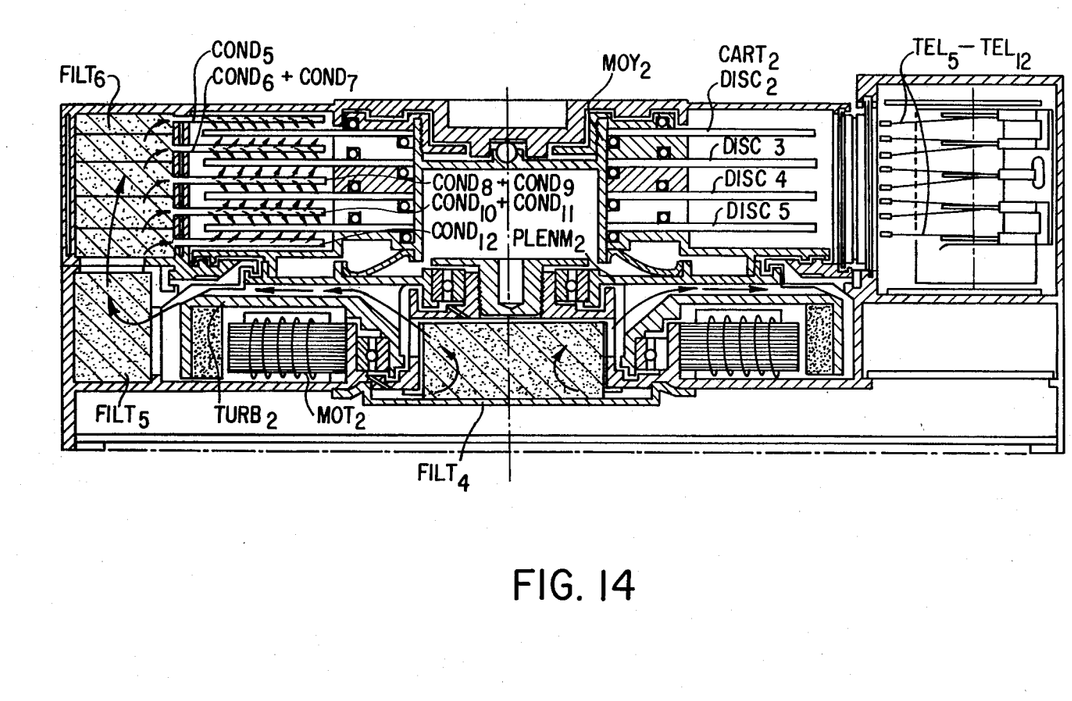
FIG. 14 is a cross-sectional view of a ventilation system in accordance with the invention, in combination with a four disc cartridge.

Reference is now made to FIG. 14 of the drawing, a side sectional view of an embodiment of the drawing including four rotatable discs $DISC_2$–$DISC_5$, carried by hub $MOY_2$, in turn driven by drive platter $PLENM_2$, integral with motor $MOT_2$. All of discs $DISC_2$–$DISC_5$ are included in cartridge $CART_2$.

Opposite faces of discs $DISC_2$–$DISC_5$ are ventilated by air supplied to them by conduits $COND_5$–$COND_{12}$, mounted similarly to conduits $COND_1$ and $COND_2$. Conduits $COND_5$–$COND_{12}$ are supplied with air flowing through filter $FILT_6$, in turn responsive to air flowing through filter $FILT_5$. Filter $FILT_6$ and conduits $COND_5$–$COND_{12}$ are an integral part of cartridge $CART_2$, while filter $FILT_5$ is a part of frame $BAT_1$ of memory unit MEMO. Air is supplied to filter $FILT_5$ by a structure integral with frame $BAT_1$, which structure comprises fan $TURB_2$ and filter $FILT_4$. Fan $TURB_2$ is driven by motor $MOT_2$, mounted coaxially with the axis of rotation of drive platter $PLENM_2$.

Air from conduits $COND_5$–$COND_{12}$ has a tendency to be entrained adjacent the surface of the disc to which the air is initially directed. Air directed against each of the surfaces of discs $DISC_2$–$DISC_5$ flows in an outwardly directed spiral to an orifice (not shown) associated with each of the discs, which orifice is similar to orifice $PEVC_1$, FIGS. 9 and 11. The air flow patterns in the multi-disc cartridge and the apparatus driving the multi-disc cartridge are thereby very similar to the air flow pattern in the single disc cartridge and the drive mechanism therefor, as described supra.

Data are written into and read from opposite faces of discs $DISC_2$–$DISC_5$ by heads $TEL_5$–$TEL_{12}$. Heads $TEL_5$–$TEL_{12}$ are located in a hermetically sealed enclosure when cartridge $CART_2$ is not in place in receptacle 201, in a manner similar to that described in connection with FIG. 12. To prevent particulate material, particularly in the form of oil from bearings included in the structure of FIG. 14, from reaching the data containing portion of discs $DISC_2$–$DISC_5$, a tortuous path is provided between the interior of cartridge $CART_2$, adjacent the axis of rotation of the disc, and the portion of the discs where data are located. The tortuous path comprises a baffle depending downwardly from the top interior wall of cartridge $CART_2$.

While there have been described and illustrated several specific embodiments of the invention, it will be clear that variations in the details of the embodiments specifically illustrated and described may be made without departing from the true spirit and scope of the invention as defined in the appended claims. For example, fan mechanisms $TURB_1$ and $TURB_2$ may be installed on hubs $MOY_1$ and $MOY_2$ inside of cartridges $CART_1$ and $CART_2$, respectively.

I claim:

1. In combination, a magnetic disc cartridge having a disc including a rotation axis; a housing for the cartridge, the housing including: transducer head means positioned above a portion of the magnetic disc where data are recorded when the cartridge is in the housing, a platter having a rotation axis coincident with the disc rotation axis when the cartridge is in the housing; a recirculating gas flow path extending from the housing into the cartridge past the heads, thence out of the cartridge and back to the housing; the gas flow path including a first filter in the housing, the flow path through the first filter being coaxial with the disc rotation axis into a plenum in the housing, the plenum including a plate having a rotation axis coincident with the disc axis, the disc when rotated about the axis thereof inducing an outwardly directed gas flow from the first filter into a first passage, the first passage being at a radial position beyond the edges of the platter and disc, the first passage being aligned with a second passage in the cartridge when the cartridge is in the housing so gas flowing into the first pasasge flows into the second passage, filter means in at least one of said passages, the gas flow path in the cartridge including: means for feeding gas flowing through the second passage to the portion of the disc where data are recorded and an orifice positioned beyond the edge of the disc, the gas feeding means and the orifice being positioned so that gas flows out of the second passage in a spiral path past the head means, thence to the orifice, and a first conduit through which the gas flowing into the orifice flows; the gas flow path in the housing including a second conduit positioned to receive gas flowing in the first conduit and for supplying the gas flowing in the first conduit to the first filter when the cartridge is in the housing.

2. The combination of claim 1 wherein the filter means includes separate second and third filters respectively positioned in the first and second conduits, the first filter being positioned to intercept dust particles lifted off of the disc by the gas flowing out of the means for feeding, the second filter being positioned to intercept contaminates introduced into the recirculation path by bearings on the rotating platter, the third filter being positioned to intercept particles introduced into the recirculating path at abutting surfaces of the cartridge and housing.

3. The combination of claim 1 wherein the platter includes radially extending vanes and a central aperture through which gas from the first filter flows, the gas flowing through the central aperture being directed by the vanes into an outwardly directed spiral, thence to the first conduit.

4. The combination of claim 1 wherein the cartridge includes gate means for enabling the head means to be inserted therein from the housing, and means for maintaining the gate means in a closed position except while the cartridge is in situ in the housing.

5. The combination of claim 1 wherein the means for supplying includes a passage extending radially with respect to the disc axis and having plural gas supplying orifices at different radii with respect to the disc axis.

6. The combination of claim 5 wherein the plural orifices of the radially extending passage are positioned to direct the gas in the same direction as the disc is turning.

7. The combination of claim 6 wherein the plural orifices on the radially extending passages, the orifice positioned beyond the disc edge, and the head means are positioned so there is laminar flow of the gas past the head.

8. The combination of claim 6 wherein the plural orifices on the radially extending passage, the orifice positioned beyond the disc edge, and the head means are positioned so the gas flow in the spiral is through about 360° and the gas flow from the plural orifices on the radially extending passage to the head is about one-half of the arcuate distance of the gas flow from the plural orifices to the orifice positioned beyond the disc edge.

9. Apparatus for ventilating a magnetic disc, the disc having a surface portion containing data, the apparatus keeping the surface-portion substantially free of particulate materials, comprising an enclosure in which the disc is mounted for rotation about an axis, means for establishing a recirculating gas path, said path including: means for supplying gas jets completely across the portion as the disc is rotating to prevent particulate material from adhering to the disc portion, an orifice for removing gas from the enclosure, and fan means for circulating the gas removed from the enclosure by the orifice about the axis as the disc is rotating and for supplying the circulated gas back to the gas jets supplying means, the disc being part of a memory unit having magnetic head means for transducing data from the portion, the enclosure including the head means being positioned relative to the orifice and inlet means for the gas jet supplying means such that the gas has laminar flow as the gas passes the magnetic head means, the laminar gas flow being such that it does not affect the position of the head means relative to the disc portion, the recirculating path including filter means for removing particulate materials from the gas circulating in the recirculating path between the orifice and the aperture means, the inlet means including aperture means disposed at different radial positions across the disc above the portion, and the orifice being positioned farther from the axis than any part of the aperture means, the orifice being positioned relative to the aperture means so that the gas flows in a spiral through approximately at least one complete revolution from the aperture means to the orifice.

10. The apparatus of claim 9 further including means for blocking the recirculating path while the enclosure is removed from a receptacle of the disc memory unit containing the head means.

11. The apparatus of claim 10 wherein the blocking means includes first gate means between an outlet of the fan means and the aperture means and second gate means between an inlet of the fan means and the orifice.

12. The apparatus of claim 10 wherein the filter means includes separate first and second filters in the inlet and outlet of the fan means.

* * * * *